(12) United States Patent
Zheng

(10) Patent No.: US 11,377,275 B2
(45) Date of Patent: Jul. 5, 2022

(54) MULTIFUNCTION CUP LID AND CUP USING SAME

(71) Applicant: Shenzhen Doageas Technology Co., ltd., Shenzhen (CN)

(72) Inventor: Jian Zheng, Shenzhen (CN)

(73) Assignee: Shenzhen Doageas Technology Co., ltd., Shenzhen (CN)

( * ) Notice: Subject to any disclaimer, the term of this patent is extended or adjusted under 35 U.S.C. 154(b) by 715 days.

(21) Appl. No.: 16/383,647

(22) Filed: Apr. 14, 2019

(65) Prior Publication Data

US 2020/0307876 A1    Oct. 1, 2020

(30) Foreign Application Priority Data

Mar. 29, 2019    (CN) .......................... 201920426628.6

(51) Int. Cl.
| | | |
|---|---|---|
| *A45F 4/00* | (2006.01) | |
| *H04R 1/10* | (2006.01) | |
| *H02J 7/00* | (2006.01) | |
| *B65D 51/24* | (2006.01) | |
| *B65D 43/02* | (2006.01) | |
| *A45F 3/16* | (2006.01) | |
| *H02J 7/02* | (2016.01) | |

(52) U.S. Cl.
CPC ............... *B65D 51/24* (2013.01); *A45F 3/16* (2013.01); *A45F 4/00* (2013.01); *B65D 43/0229* (2013.01); *H02J 7/0044* (2013.01); *H02J 7/025* (2013.01); *H04R 1/1016* (2013.01); *H04R 1/1025* (2013.01); *H04R 1/1041* (2013.01); *H04R 2420/07* (2013.01)

(58) Field of Classification Search
CPC .... B65D 51/24; H04R 1/1016; H04R 1/1025; A45F 4/00; H02J 7/0044
USPC .................................................. 320/107, 115
See application file for complete search history.

(56) References Cited

U.S. PATENT DOCUMENTS

2011/0284416 A1* 11/2011 Sowers ............... B60R 11/0247
                                                                  206/459.5
2015/0314102 A1* 11/2015 Rosenberg ............ A61M 21/00
                                                                  600/27

FOREIGN PATENT DOCUMENTS

| CN | 106510178 A | * | 3/2017 | ............... A45F 3/16 |
| CN | 106510179 A | * | 3/2017 | ............... A45F 3/16 |
| CN | 106724554 A | * | 5/2017 | |
| CN | 206212222 U | * | 5/2017 | |
| WO | WO-2017201500 A1 | * | 11/2017 | ........... G06F 1/1626 |

* cited by examiner

*Primary Examiner* — Richard V Muralidar

(57) ABSTRACT

A multifunction cup lid used for engaging with a corresponding cup body of a cup includes a charging member for receiving a suitable earphone to charge the earphone, and a cap adapted to receive the charging member therein so that the earphone can be taken out of or put in the multifunction cup lid via opening or closing the charging member. The present structure can receive and charge the earphone via providing with the charging member, thereby users can use the cup with the multifunction cup lid to achieve the purpose of carrying one object with a variety of functions to further reduce the carrying burden and strengthen the convenience.

19 Claims, 3 Drawing Sheets

MULTIFUNCTION CUP LID AND CUP USING SAME

BACKGROUND

1. Technical Field

The present disclosure generally relates to cups field, and especially relates to a multifunction cup lid and a cup using same.

2. Description of Related Art

As is known to all, the portability of water cups brings great convenience to people who love outdoor activities. However, a conventional water cup is used as a single water storage container so that it can't meet the more demands of, people who loving outdoor activities. For example, people often wear earphones to enjoy music and watch video when they do outdoor activities. The conventional Bluetooth wireless earphones are gradually becoming new favorite because it has no wires to be conveniently used. Of course, this kind of earphone is also brought the risk of loss. Therefore, earphone manufacturers design a charging member for such products, so that the power can be supplemented while the earphone is stored to further extend the battery life of the earphone. But, it also leads to an increase of stuff that people needs to carry when they go out, which is needed for improvement.

SUMMARY

The technical problems to be solved: in view of the shortcomings of the related art, the present disclosure relates to a multifunction cup lid and a cup using same which can use the cup with the multifunction cup lid to achieve the purpose of carrying one object with a variety of functions to further reduce the carrying burden and strengthen the convenience.

The technical solution adopted for solving technical problems of the present disclosure is:

A multifunction cup lid used for engaging with a corresponding cup body of a cup includes a charging, member formed on the multifunction cup lid for taking out of or putting in a suitable earphone therein to charge the earphone, and a cap adapted to receive the charging member therein so that the earphone can be taken out of or put in the multifunction cup lid via, opening or closing the charging member.

Wherein a covering portion is formed on a bottom portion of the multifunction cup lid for covering on the cup body of the cup, the charging member formed on a middle portion of the multifunction cup lid, and the cap formed on an upper portion of the multifunction cup lid.

Wherein the multifunction cup lid further includes a receiving room formed on the middle portion thereof for receiving a power supply and a main board therein, a container of the charging member formed on the middle of an upper plate of the receiving room for receiving the earphone to charge the earphone.

Wherein one end of the cap is rotatably connected to the middle portion of the multifunction cup lid, and the other end of the cap is connected to the middle portion of the multifunction cup lid via an open-and-close buckle structure.

Wherein the cap is connected to the upper portion, of the multifunction cup lid via a rotatable fastener.

Wherein the container includes a magnet ring, formed therein for adsorbably fixing the earphone.

Wherein the main board includes a charging port exposed out of the upper plate of the receiving room.

Wherein the charging member is configured with a wireless charging mode to realize power supplement.

Wherein the buckle structure includes a pair of side plates formed on two opposite ends of a sidewall of the middle portion, a rotating shaft formed between the pair of side plates, a button rotatably connected to the rotating shaft, and a compression spring positioned between the bottom of the button and the multifunction cup lid, one portion of the compression spring fixed with the multifunction cup lid, and the other portion of the compression spring resisted against the bottom of the button, the button including a locking slot formed inside the upper thereof and the cap including a locking plate formed corresponding to the locking slot.

A cup according to an exemplary embodiment of the present disclosure includes a cup body and a multifunction cup lid shown above to engage with the cup body.

Wherein the cup further includes a connecting belt connected between the multifunction cup lid and the cup body.

The present disclosure provides the advantages as below.

The structure of the present disclosure can receive and charge the earphone via providing with the charging member, thereby users can use the cup with the multifunction cup lid to achieve the purpose of carrying one object with a variety of functions to further reduce the carrying burden and strengthen the convenience.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
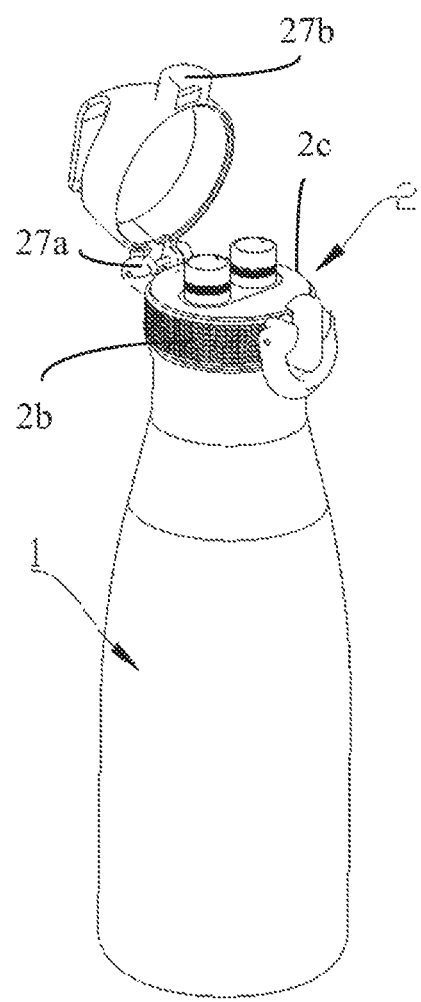
FIG. 1 is a schematic view of the cup with the multifunction cup lid in accordance with an exemplary embodiment.

The disclosure is illustrated by way of example and not by way of limitation in the figures of the accompanying drawings, in which like reference numerals indicate similar elements.

According to the described exemplary embodiment of the present disclosure, all other embodiments obtained by one of ordinary skill in the related art without the need for a creative labor are within the protection scope of the present disclosure. Unless defined otherwise, the technical terms or scientific terms used for the present disclosure shall be a general meaning commonly understood by those having ordinary skill in the related art to which the present disclosure is applied.

In the description of the present disclosure, it needs to be understood that the terms mentioned below: the terms such as "first" and "second" shown in the specification are only used to describe, but not indicated that the elements of the present disclosure is important or represented the amount of the elements. That is, the features limited by the terms of "first" and "second" may explicitly or implicitly include one or more features. Similar, in the description of the present disclosure, the meaning of the term "one", "a" and "the" don't indicate a quantitative limit, but rather not less than two unless it is specifically illustrated. Furthermore, the terms such as "include", "including", "comprising" and "comprise" and the like means that elements or items in front of such term is intended to cover the elements or objects appeared the list behind the term and its equivalent, without excluding other elements or items. In the description of the present disclosure, except where specifically otherwise illustrated or limited, the terms "install", "connect", "link" and "fix" used herein should be understood in a broad perceive. Such as, the meaning may be tight connection, removable connection, or integrated connection. The meaning may also be mechanical connection, electrical connection, direct connection or indirect connection through intermediaries, or internal connection within two elements. The meaning of the terms used herein may be understood by one of ordinary skill in the related art according to specific conditions of the present disclosure. In addition, the terms such as "upper", "below", "left", and "right", etc, are shown in the specification of the present disclosure. The indicated orientation or position of the terms shown in the detailed description is containerd on the orientation or position shown in the figures of the accompanying drawings of the present disclosure, which is only to easily simplify the description of the present disclosure, but not indicated that the devices or elements of the present disclosure should have a particular orientation or should be designed and operated in a particular orientation. So the terms illustrated in the detail description are not by way of the limitation of the present disclosure.

Figure 2:
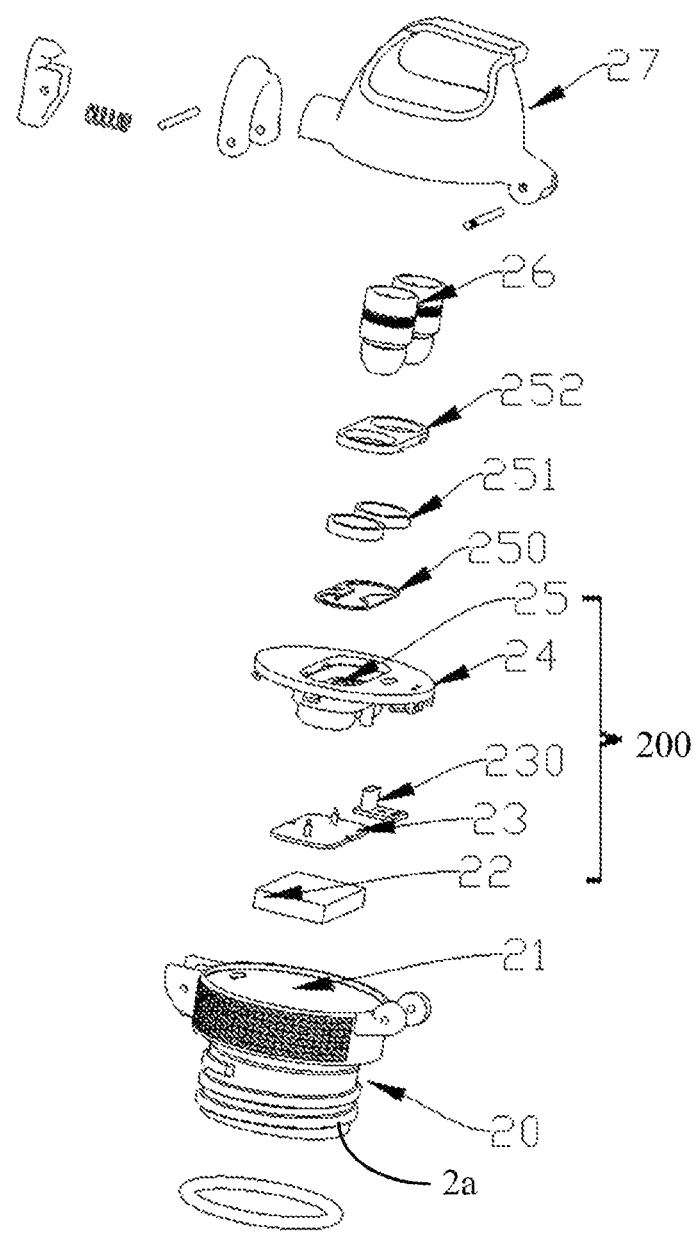
FIG. 2 is an exploded, schematic view of the multifunction cup lid of FIG. 1.
Figure 3:
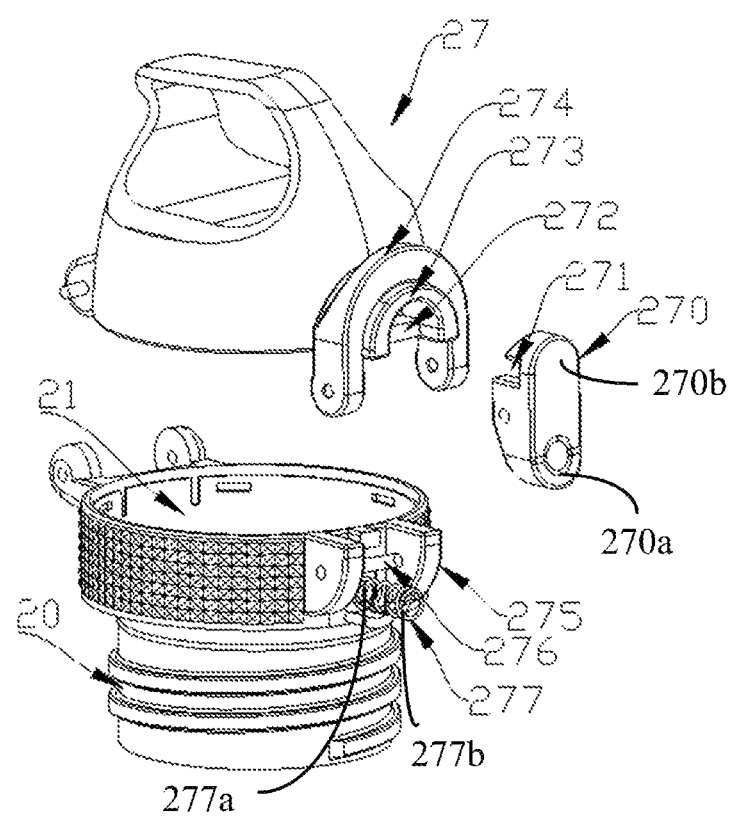
FIG. 3 is a partial exploded, schematic view of the multifunction cup lid of FIG. 1.

Referring to FIGS. 1-3, a multifunction cup lid 2 used for engaging with a corresponding cup body 1 of a cup includes a charging member 200 for receiving a suitable earphone 26 to charge it, and a cap 27 adapted to receive the charging member 200 therein so that the earphone 26 can be taken out of or put in the multifunction cup lid 2 via opening or closing the charging member 200. The present structure can receive and charge the earphone 26 via providing with the charging member 200, thereby users can use the cup with the multifunction cup lid 2 to achieve the purpose of carrying one object with a variety of functions to further reduce the carrying burden and strengthen the convenience.

The multifunction cup lid 2 further includes a covering portion 20 formed on its bottom portion 2a for covering on the cup body 1 of the cup. In this way, the covering portion 20 can engage with the cup body 1 by means of a tight fitting way or a clasp way or a thread connection way (shown in the figures). The charging member 200 is formed on a middle portion 2b of the multifunction cup lid 2, and correspondingly, the cap 27 is formed on an upper portion 2c of the multifunction cup lid 2. The above three members are designed with the above, middle and below distributions in order, thereby the multifunction cup lid 2 is provided with a reasonable structure for easily achieving corresponding operations and functions.

A common structure of the charging member 200 can be referenced to the structure of AirPods. The charging member 200 generally includes a power supply 22, a main board 23 and the container 25. The container 25 includes a pair of chambers for respectively receiving left and right earphones 26 therein. The main board 23 includes an electrode inserting into the container 25 to electrically connect with the earphone 26 for charging the earphone 26. In an exemplary embodiment of the present disclosure, a receiving room 21 is formed on the middle portion 2b of the multifunction cup lid 2 and configured to receive the power supply 22 and the main board 23 therein. The container 25 of the charging member 200 is formed on the middle of an upper plate 24 of the receiving room 21, and the cap 27 is adapted to engage with the upper plate 24.

Specifically, the middle of the upper plate 24 is slightly concave downward to form the container 25 and pins of the main board 23 is inserted into the container 25 from the bottom of the container 25. At the same time, a conductive pad 250 is installed in the container 25. In this way, electrodes at the bottom, of the earphone 26 are in contact with the pins of the main board 23, and the electrode at the waist of the earphone 26 is in contact with the conductive pad 250, so as to realize the conduction of its charging circuit. Preferably, a magnet ring 251 is formed inside the container 25 for adsorbing metal parts of the earphone 26 so as to tightly fix the earphone 26 with the container 25. In case of accidental loss, a mounting member 252 is assembled on an entrance of the container 25 to fix the components shown above within the container 25.

In some exemplary embodiments of the present disclosure, the cap 27 is connected to the upper portion 2c of the multifunction cup lid 2 via a rotatable fastener. The configuration of the rotatable fastener can be commonly designed, and it is controlled to be opened or closed via horizontally rotating the cap 27. The rotatable fastener generally includes a locking block formed on the cap 27 and an L-shaped slot fainted on the upper of the receiving room 21, respectively. The L-shaped slot includes a longitudinal slot and a transverse slot connected with each other. When the cap 27 is locked, the locking block enters from the longitudinal slot, and then is driven to rotate the cap 27 to move along the transverse slot so as to lock it out of position with the longitudinal slot, thereby the cap 27 is tightly fixed with the multifunction cup lid 2. When the cap 27 is unlocked, the cap 27 is reversed to rotate so that the locking block is reset to the position corresponding to the longitudinal slot to further open the cap 27.

In an exemplary embodiment of the present disclosure, it is preferred by the following way: one end 27a of the cap 27 is rotatably connected to the middle portion 2b of the multifunction cup lid 2, and the other end 27b of the cap 27 is connected to the middle portion 2b of the multifunction cup lid 2 via an, open-and-close buckle structure. A torsion spring is installed on a hinging point of the cap 27 so that the cap 27 can be conveniently opened under elastic force of torsion spring during opening the open-and-close buckle structure.

In order to strengthen the safety and stability of the cap 27, the buckle structure can be set as follows: a pair of opposite side plates 275 is formed on a sidewall of the middle portion 2b, a rotating shaft 276 is formed between the pair of side plates 275, a button 270 is rotatably connected to the rotating shaft 276, and a compression spring 277 is positioned between the bottom of the button 270 and the multifunction cup lid 2. One portion 277a of the compression spring 277 is fixed with the multifunction cup lid 2, and the other portion 277b of the compression spring 277 is resisted against the bottom 270a of the button 270. The button 270 includes a locking slot 271 formed inside the upper 270b thereof and the cap 27 includes a locking plate 272 formed corresponding to the locking slot 271.

When needing to unlock the cap 27, the bottom of the button 270 is pressed to rotate the button 270, and the upper of the button 270 moves outward until the locking slot 271 is separated from the locking plate 272, thereby the cap 27 is unlocked. In this way, the cap 27 can be rotated and opened along the other end thereof to expose the container 25 outward, thereby the earphone 26 is realized, to be taken out and put in. When needing to lock, the cap 27, the cap 27 is rotated to fix the locking plate 272 with the locking slot 271 and the compression spring 277 releases its elastic force to resist against the button 270. In order to enhance the reliability of the structure, double insurance can be set up. For example, a baffle 273 is arranged on the cap 27, and an adaptive movable clasp 274 is arranged on the middle portion 2b of the multifunction cup lid 2. The movable clasp 274 is resisted against the baffle 273 when the cap 27 is locked. It can be understood that the clasp 274 can be designed to rotatably assemble with the aforementioned rotating shaft 276, which is conducive to simplifying the structure setting and centralizing the layout for easy operation.

In some exemplary embodiments of the present disclosure, the main board 23 includes a charging port 230 exposed out of the upper plate 24 of the receiving room 21. The charging port 230 is configured to realize power supplement of the power supply 22. The charging port 230 is set at the upper plate 24 of the receiving room 21 so that the charging port 230 can be properly hidden to prevent dust and water from entering therein, thereby the overall appearance of the product is more harmonious. Furthermore, the power supplement of the power supply 22 can be configured with a wireless charging, which is more convenient to use.

In conclusion, the cup is equipped with the improved multifunction cup lid 2 and a connecting belt can be set to connect between the multifunction cup lid 2 and the cup body 1 in order to avoid the loss of the cup. thereby users can use the cup with the multifunction cup lid to achieve the purpose of carrying one object with a variety of functions to further reduce the carrying burden and strengthen the convenience.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A multifunction cup lid used for engaging with a corresponding cup body of a cup comprising:
   a charging member fanned on the multifunction cup lid for taking out or putting in a suitable earphone therein to charge the earphone; and
   a cap adapted to receive the charging member therein so that the earphone can be taken out of or put in the multifunction cup lid via opening or closing the charging member.

2. The multifunction cup lid as claimed in claim 1, wherein a covering portion is formed on a bottom portion of the multifunction cup lid for covering on the cup body of the cup, the charging member formed on a middle portion of the multifunction cup lid, and the cap fanned on an upper portion of the multifunction cup lid.

3. The multifunction cup lid as claimed in claim 2, wherein the multifunction cup lid further comprises a receiving room formed on the middle portion thereof for receiving a power supply and a main board therein, a container of the charging member formed on the middle of an upper plate of the receiving room for receiving the earphone to charge the earphone.

4. The multifunction cup lid as claimed in claim 3, wherein one end of the cap is rotatably connected to the middle portion of the multifunction cup lid, and the other end of the cap is connected to the middle portion of the multifunction cup lid via an open-and-close buckle structure.

5. The multifunction cup lid as claimed in claim 3, wherein the cap is connected to the upper portion of the multifunction cup lid via a rotatable fastener.

6. The multifunction cup lid as claimed in claim 3, wherein the container comprises a magnet ring formed therein for adsorbably fixing the earphone.

7. The multifunction cup lid as claimed in claim 3, wherein the main board comprises a charging port exposed out of the upper plate of the receiving room.

8. The multifunction cup lid as claimed in claim 1, wherein the charging member is configured with a wireless charging mode to realize power supplement.

9. The multifunction cup lid as claimed in claim 4, wherein the buckle structure comprises a pair of side plates formed on two opposite ends of a sidewall of the middle portion, a rotating shaft fainted between the pair of side plates, a button rotatably connected to the rotating shaft, and a compression spring positioned between the bottom of the button and the multifunction cup lid, one portion of the compression spring fixed with the multifunction cup lid, and the other portion of the compression spring resisted against the bottom of the button, the button comprising a locking slot formed inside the upper thereof and the cap comprising a locking plate formed corresponding to the locking slot.

10. A cup comprising:
    a cup body;
    a multifunction cup lid engaging with the cup body and comprising:
    a charging member formed on the multifunction cup lid for taking out or putting in a suitable earphone therein to charge the earphone; and
    a cap adapted to receive the charging member therein so that the earphone can be taken out of or put in the multifunction cup lid via opening or closing the charging member.

11. The cup as claimed in claim 10, wherein the cup further comprises a connecting belt connected between the multifunction cup lid and the cup body.

12. The cup as claimed in claim 10, wherein a covering portion is formed on a bottom portion of the multifunction cup lid for covering on the cup body of the cup, the charging member formed on a middle portion of the multifunction, cup lid, and the cap formed on an upper portion of the multifunction cup lid.

13. The cup as claimed in claim 10, wherein the charging member is configured with a wireless charging mode to realize power supplement.

14. The cup as claimed in claim 12, wherein the multifunction cup lid further comprises a receiving room formed on the middle portion thereof for receiving a power supply and a main board therein, a container of the charging member formed on the middle of an upper plate of the receiving room for receiving the earphone to charge the earphone.

15. The cup as claimed in claim 14, wherein one end of the cap is rotatably connected to the middle portion of the multifunction cup lid, and the other end of the cap is connected to the middle portion of the multifunction cup lid via an open-and-close buckle structure.

16. The cup as claimed in claim 14, wherein the cap is connected to the upper portion of the multifunction cup lid via a rotatable fastener.

17. The cup as claimed in claim 14, wherein the container comprises a magnet ring formed therein for adsorbably fixing the earphone.

18. The cup as claimed in claim 14, wherein the main board comprises a charging port exposed out of the upper plate of the receiving room.

19. The cup as claimed in claim 15, wherein the buckle structure comprises a pair of side plates formed on two opposite ends of a sidewall of the middle portion, a rotating, shaft formed between the pair of side plates, a button rotatably connected to the rotating shaft, and a compression spring positioned between the bottom of the button and the multifunction cup lid, one portion of the compression spring fixed with the multifunction cup lid, and the other portion of the compression spring resisted against the bottom of the button, the button comprising a locking slot formed inside the upper thereof and the cap comprising a locking plate formed corresponding to the locking slot.

\* \* \* \* \*